United States Patent
Petterson et al.

(10) Patent No.: US 12,467,006 B2
(45) Date of Patent: Nov. 11, 2025

(54) METHOD AND DEVICES COMBINING DIESEL FUEL AND HYDROGEN GAS TO FORM A HOMOGENIZED LIQUID HYDRO-DIESEL FUEL

(71) Applicant: H2DIESEL, INC., Lewes, DE (US)

(72) Inventors: John S. Petterson, La Jolla, CA (US); John L. Haller, La Jolla, CA (US)

(73) Assignee: H2DIESEL, INC., Lewes, DE (US)

( * ) Notice: Subject to any disclaimer, the term of this patent is extended or adjusted under 35 U.S.C. 154(b) by 0 days.

(21) Appl. No.: 18/693,103

(22) PCT Filed: Oct. 23, 2023

(86) PCT No.: PCT/US2023/035695
§ 371 (c)(1),
(2) Date: Mar. 18, 2024

(87) PCT Pub. No.: WO2024/091443
PCT Pub. Date: May 2, 2024

(65) Prior Publication Data
US 2025/0250498 A1 Aug. 7, 2025

Related U.S. Application Data

(60) Provisional application No. 63/536,154, filed on Sep. 1, 2023, provisional application No. 63/419,435, filed on Oct. 26, 2022.

(51) Int. Cl.
*C10L 1/02* (2006.01)
(52) U.S. Cl.
CPC ............. *C10L 1/02* (2013.01); *C10L 2230/22* (2013.01); *C10L 2290/141* (2013.01); *C10L 2290/24* (2013.01)

(58) Field of Classification Search
CPC .. C10L 1/02; C10L 2230/22; C10L 2290/141; C10L 2290/24
See application file for complete search history.

(56) References Cited

U.S. PATENT DOCUMENTS 4,259,021 A * 3/1981 Goudy, Jr. ......... F02M 25/0228
366/144
4,334,889 A 6/1982 Takabayashi
(Continued)

FOREIGN PATENT DOCUMENTS

CN 110240953 A 9/2019
DE 102013003982 A1 9/2014
(Continued)

OTHER PUBLICATIONS

United States International Searching Authority, International Search Report and Written Opinion for corresponding International Application No. PCT/US2024/017795, mailed Aug. 7, 2024, 15 pages.
(Continued)

*Primary Examiner* — Ellen M Mcavoy
*Assistant Examiner* — Chantel Graham
(74) *Attorney, Agent, or Firm* — David R. Heckadon; Gordon Rees Scully Mansukhani LLP

(57) ABSTRACT

A system for enhancing diesel fuel combustion; including: a liquid diesel fuel source; a hydrogen gas source; an oxygen source; and either (a) a mixer configured with inputs to receive each of the liquid diesel fuel, hydrogen gas and oxygen gas therein, wherein the mixer is a cylindrical container having an entrance funnel and an exit funnel, or (b) tube infuser having a liquid-gas mixing chamber with a volume up to 10 Gal, and a dwell time from gas additive/fuel mixing in the range of 15 minutes. Passive and active agitation structures are also included to facilitate mixing.

26 Claims, 9 Drawing Sheets

(56) References Cited

U.S. PATENT DOCUMENTS

| | | | |
|---|---|---|---|
| 4,388,893 A | 6/1983 | Apfel | |
| 4,742,810 A | 5/1988 | Anders et al. | |
| 6,164,813 A * | 12/2000 | Wang | B01F 23/43 366/339 |
| 6,205,981 B1 | 3/2001 | Lorraine | |
| 6,207,064 B1 | 3/2001 | Gargas | |
| 6,478,857 B2 | 11/2002 | Czabala | |
| 6,606,855 B1 | 8/2003 | Kong et al. | |
| 6,641,625 B1 | 11/2003 | Clawson et al. | |
| 6,804,950 B2 | 10/2004 | Kong et al. | |
| 6,988,033 B1 | 1/2006 | Lowrey et al. | |
| 7,377,272 B2 | 5/2008 | Davidson | |
| 7,430,991 B2 | 10/2008 | VanHoose et al. | |
| 7,621,260 B2 | 11/2009 | Mitani et al. | |
| 7,715,961 B1 | 5/2010 | Kargupta | |
| 7,789,047 B2 | 9/2010 | Kuroki et al. | |
| 7,841,762 B2 | 11/2010 | Oogawara et al. | |
| 7,861,696 B2 | 1/2011 | Lund | |
| 7,882,789 B2 | 2/2011 | Kumar et al. | |
| 7,946,258 B2 | 5/2011 | Adams | |
| 8,176,884 B2 | 5/2012 | Tewari et al. | |
| 8,333,171 B2 | 12/2012 | Lund | |
| 8,377,180 B2 | 2/2013 | Maeda et al. | |
| 8,478,514 B2 | 7/2013 | Kargupta | |
| 8,544,452 B1 | 10/2013 | Galvin et al. | |
| RE45,413 E | 3/2015 | Lund | |
| 9,388,749 B2 | 7/2016 | MacDonald | |
| 9,527,046 B1 | 12/2016 | Roe | |
| 9,586,186 B2 | 3/2017 | Roe | |
| 9,638,136 B2 | 5/2017 | Jung | |
| 9,884,162 B2 | 2/2018 | Kobayashi et al. | |
| 9,945,299 B2 | 4/2018 | Lund | |
| 10,080,998 B2 | 9/2018 | Roe et al. | |
| 10,280,877 B2 | 5/2019 | Hamad et al. | |
| 10,486,114 B2 | 11/2019 | Roe | |
| 10,494,992 B2 | 12/2019 | Johnson et al. | |
| 10,527,013 B2 | 1/2020 | St. Mary et al. | |
| 10,605,162 B2 | 3/2020 | Johnson et al. | |
| 10,746,094 B2 | 8/2020 | Johnson et al. | |
| 10,815,123 B2 | 10/2020 | Northrop | |
| 10,920,717 B1 | 2/2021 | Owens | |
| 11,239,479 B2 | 2/2022 | Katikaneni et al. | |
| 11,247,014 B2 | 2/2022 | Koizumi et al. | |
| 11,598,276 B1 | 3/2023 | Klingbeil et al. | |
| 12,134,990 B2 | 11/2024 | Petterson et al. | |
| 2002/0127445 A1 | 9/2002 | Carpenter et al. | |
| 2004/0101795 A1 * | 5/2004 | Fairfull | F23L 7/007 431/2 |
| 2006/0288869 A1 | 12/2006 | Warren et al. | |
| 2007/0020568 A1 | 1/2007 | Finley | |
| 2007/0033929 A1 | 2/2007 | Telford et al. | |
| 2008/0223332 A1 | 9/2008 | Maro et al. | |
| 2008/0223344 A1 | 9/2008 | Suzuki et al. | |
| 2008/0245318 A1 * | 10/2008 | Kuroki | F02D 19/0605 123/3 |
| 2009/0012698 A1 | 1/2009 | Shinagawa et al. | |
| 2010/0228415 A1 | 9/2010 | Paul | |
| 2010/0294994 A1 | 11/2010 | Basini et al. | |
| 2011/0023853 A1 | 2/2011 | Lund | |
| 2011/0061622 A1 | 3/2011 | Lund | |
| 2012/0037098 A1 | 2/2012 | Wey | |
| 2012/0186560 A1 | 7/2012 | Lund | |
| 2013/0175201 A1 | 7/2013 | Caliga et al. | |
| 2013/0269243 A1 | 10/2013 | Lund | |
| 2015/0081199 A1 | 3/2015 | Chauncey et al. | |
| 2015/0114351 A1 | 4/2015 | Lund | |
| 2015/0136047 A1 | 5/2015 | Hou | |
| 2015/0226113 A1 | 8/2015 | Alexander et al. | |
| 2016/0362114 A1 | 12/2016 | Chauncey et al. | |
| 2019/0085802 A1 | 3/2019 | St. Mary et al. | |
| 2019/0145327 A1 | 5/2019 | Gieger et al. | |
| 2020/0061549 A1 | 2/2020 | Roe | |
| 2021/0101110 A1 | 4/2021 | Rheaume et al. | |
| 2021/0131361 A1 | 5/2021 | Turner et al. | |
| 2022/0325684 A1 | 10/2022 | Lawhorn | |
| 2023/0268538 A1 | 8/2023 | Wiekmamp | |
| 2023/0340919 A1 | 10/2023 | Mercal et al. | |
| 2023/0417198 A1 | 12/2023 | Lund | |

FOREIGN PATENT DOCUMENTS

| | | | |
|---|---|---|---|
| DE | 102029213283 A1 | 3/2021 | |
| EP | 1883750 B1 | 2/2008 | |
| WO | 2006126341 A2 | 11/2006 | |
| WO | 2007062217 A2 | 5/2007 | |
| WO | 2008125976 A2 | 10/2008 | |
| WO | 2014039663 A2 | 3/2014 | |
| WO | 2017004551 A1 | 1/2017 | |
| WO | 2017205681 A1 | 11/2017 | |
| WO | 2022096718 A1 | 5/2022 | |
| WO | 2023154174 A1 | 8/2023 | |

OTHER PUBLICATIONS

NissanConnect Services Remote Engine Start/Stop, Nissan, 2022, 4 pages, https://web.archive.org/web/20221203160155/https://www.nissanusa.com/connect/features-apps/remote-engine-start.html.

United States International Searching Authority, Invitation to Pay Additional Fees for International Application No. PCT/US2024/017795, mailed May 30, 2024, 2 pages.

United States International Searching Authority, International Search Report and Written Opinion for corresponding International Application No. PCT/US2023/035695, mailed Feb. 7, 2024, 12 pages.

United States International Searching Authority, International Search Report and Written Opinion for corresponding International Application No. PCT/US2023/037208, mailed Feb. 22, 2024, 10 pages.

Green Car Congress, Hydrogen-Enhanced Combustion Engine Could Improve Gasoline Fuel Economy by 20% to 30%, Nov. 5, 2005, https://www.greencarcongress.com/2005/11/hydrogenenhance.html, 2 pages.

Lee et al., Plasma Assisted Hydrogen Generation: A Mechanistic Review, Fuel Processing Technology 247 (2023) 107761, 16 pages.

United States International Searching Authority, International Search Report and Written Opinion for corresponding International Application No. PCT/US2023/081152, mailed Apr. 29, 2024, 13 pages.

United States International Searching Authority, International Search Report and Written Opinion for corresponding International Application No. PCT/US2023/081154, mailed Mar. 28, 2024, 12 pages.

* cited by examiner

METHOD AND DEVICES COMBINING DIESEL FUEL AND HYDROGEN GAS TO FORM A HOMOGENIZED LIQUID HYDRO-DIESEL FUEL

RELATED APPLICATIONS

The present invention claims priority to U.S. Provisional Patent Application Ser. No. 63/419,435, filed Oct. 26, 2022, entitled "Systems And Devices For Combining Diesel Fuel And Hydrogen Gas To Form A Homogenized Liquid Hydro-Diesel Fuel", and to U.S. Provisional Patent Application Ser. No. 63/536,154, filed Sep. 1, 2023, entitled "Infuser For Forming A Homogenized Liquid Hydro-Diesel Fuel", the entire disclosures of which are incorporated herein by reference in their entireties for all purposes.

TECHNICAL FIELD

The present system relates to hydro-diesel internal combustion engines and more particularly to mixers and tube infusers that combine liquid fuel, such as liquid diesel fuel together with at least one or more gas additive, such as hydrogen, oxygen or gaseous fuels as small bubbles in the liquid fuel for use in a hydro-diesel engine.

BACKGROUND OF THE INVENTION

A conventional diesel engine passes diesel fuel at a nominal pressure from the fuel tank to the lift pump. The lift pump pre-pressurizes the fuel and passes the fuel on to an injector pump. The injector pump then pressurizes the fuel to injector pressures and then passes the fuel onto direct injectors or a common rail for subsequent injection into the combustion chamber. Air is passed into the combustion chamber through the air intake as the piston in the chamber recedes. As the piston rises it squeezes the air volume heating up air raising the air to a temperature that causes the diesel fuel that is injected into the chamber as the piston moves to Top Dead Center (TDC) to spontaneously combust increasing the pressure in the chamber and forcing the piston down.

A hydro-diesel engine is a diesel engine which uses a mixture of hydrogen gas and diesel fuel with the hydrogen gas being mixed homogeneously as small bubbles into the liquid diesel fuel. An example of a hydro-diesel engine system is found in pending patent application WO 2022/0967168, entitled "Constant Pressure Fuel Enhancement And Method", incorporated herein by reference in its entirety for all purposes. This system is specifically directed to providing a preferred ratio of gas to liquid in a constant pressure fuel mixture. The system uses an injector which may be mechanically or electrically controlled. In this system, only part of the fuel applied to the injector is actually injected into the combustion chamber. The remainder of the fuel flows out of the fuel injector and/or common rail and is returned to the combiner/infuser. This return fuel can also be used to lubricate and/or is used to cool the injector and id directed through a heat exchanger and pressure return for cooling, pressure equalizing and is filtered before being returned to the infuser. Patent application WO 2022/0967168 specifically incorporates the infuser described in U.S. Pat. No. 9,945,299 which is simply a series of tubes through which the gas and liquid fuel pass to mix.

Unfortunately, the gas infused fuel can cause problems like cavitation, undesirable pressure fluctuations and unstable engine operation. Therefore, this system must be operated at a sufficiently high pressure to prevent large gas bubble formation. The pump system and the control system work together to maintain the desired pressures. In this system, the infuser sits between two pumps which increase the pressure in stages. Excess fuel that is not injected into the combustion chamber is returned through a return fuel line.

It would be desirable to avoid the use of such a standard infuser since infusers tend to be large and require considerable energy to operate. As will be shown, the present system achieves this objective. Secondly, in these various hydro-diesel systems, the desire to increase combustion efficiency is always a factor. Put simply, increased combustion efficiency is the desired objective.

In one aspect, the present system is directed to a hydro-diesel engine that provides a substantial improvement in efficiency and reduction of noxious greenhouse gases over that generated by a conventional diesel engine using conventional diesel fuel. Except for the infuser and the hydro-diesel fuel mixture, the operation of the present hydro-diesel engine is similar to a conventional diesel engine. The conventional source of the hydrogen gas in the hydro-diesel engine may be from a pressurized hydrogen tank or a water hydrolysis device. Alternative embodiments of the hydro-diesel engine also include mixing hydrogen gas with other gaseous fuels and/or oxidizer to the diesel fuel. In an alternative embodiment of the hydro-diesel engine, oxygen can be added to further argument the diesel fuel-hydrogen mixture. Air is injected into the combustion chamber through an air intake. The hydro-diesel fuel mixture is injected into the chamber via a fuel injector as the piston raises to TDC. The present hydro-diesel engine provides a more complete combustion of the fuel by using and injecting the hydro-diesel fuel whereby to provide a more efficiency combustion of upwards of 20 to 30%.

Although infusers have been used in hydro-diesel engines, it is desirable to provide new infuser systems that offer enhanced fuel mixing efficiencies. Specifically, enhanced combustion efficiencies are achieved by infusers that create a more homogeneous blend of gas additive in the liquid fuel that is fed into the vehicle's engine.

In another aspect, the present system provides an improved infuser for use with a hydro-diesel engine. As will be explained, the infuser of the present invention provides a substantial improvement in efficiency and reduction of noxious greenhouse gases over that generated by a conventional diesel engine using conventional diesel fuel. As will be shown, the present tube infuser provides enhanced mixing of the gas fuel into the liquid fuel such that only very small bubbles of gas additives are found in the liquid fuel that is sent into the vehicle's engine. This enhanced mixing to create a homogeneous mixture of gas and liquid is achieved in the present invention infuser shape and geometry in which surface friction within the infuser to assist in breaking up and/or homogenizing the gas bubbles into smaller sizes. Additional novel features are also included with the present infuser as explained herein.

SUMMARY OF THE INVENTION

The present invention is directed to various devices that combine preselected gaseous additives into the liquid diesel fuel. In a first aspect, this combining is performed by a mixer which is more efficient and cost effective at creating a hydro-diesel diesel fuel, or other diesel plus gas additives, in less space and at less cost as compared to a traditional infuser. The present mixer structure is a new, useful and non-obvious enhancement over the conventional combining device. The present mixer provides an improved substitute for the use of an infuser for combining hydrogen gas with diesel fuel. In preferred aspects, the present mixer uses novel agitation systems that include both passive and active agitation systems, which have not been used before. In the present system, the mixer replaces the infuser of the hydro-diesel engine as the device that combines the hydrogen gas (and/or oxygen or other gas additives) into the liquid diesel fuel. One advantage of using the present mixer over an infuser is that a mixer takes less space, is easier to fabricate, and is less expensive. Another advantage of using the present mixer is that a mixer requires less energy to operate.

In preferred aspects, the present mixing system provides a method of enhancing diesel fuel with a gas additive (hydrogen, oxygen or the gaseous additive) by passing the diesel fuel and the gas additives into a mixing chamber to create a homogenized combination of liquid fuel and gasses. This method preferably comprises:
  (a) providing a supply of liquid diesel fuel;
  (b) passing the liquid diesel into a mixing chamber;
  (c) providing a supply of one or more gas additives;
  (d) bubbling the gas additives separately as passed into the liquid diesel fuel;
  (e) agitating the gas additives within the liquid diesel fuel to form a homogenous mixture;
  (f) pressurizing the homogenous mixture thereby reducing the size of gaseous bubbles;
  (g) receiving air into the combustion chamber through an air intake;
  (h) compressing the air within the combustion chamber by raising a piston in the chamber causing the air to heat;
  (g) injecting the pressurized homogenous mixture into a combustion chamber;
  (h) exposing the fuel mixture to a lower combustion chamber pressure thereby permitting the size of hydrogen bubbles to expand and further break up the diesel fuel particles and distribute the fuel throughout the combustion chamber; and
  (g) permitting the fuel mixture to spontaneously combust in the combustion chamber, thereby producing a more complete and efficient burn and forcing the engine piston downwards.

In preferred aspects, the present invention is directed to a device that combines additional gaseous additives; gaseous fuels and gaseous oxidizers into the liquid diesel fuel. The present mixer advantageously creates a combustion that is more efficient that a conventional diesel engine. In addition, the present mixer takes less space, is easier to build, and is less expensive than other fuel and gas combiners. As such, the present invention is a new useful and non-obvious improvement to combining diesel fuel with a gaseous additive. The present mixer thus replaces the fuel and gas infuser of prior art hydro-diesel engines.

In a preferred aspect, the mixer is a cylindrical container having an entrance and an exit. The mixer preferably has a diameter between 2" and 8" and a length between 6" and 24", and the entrance and exit preferably have a transition length of between 3" and 10". In preferred aspects, the present mixer's chamber diameter is from 10% to 75% of its length. The present inventors have found this preferred dimension to offer unexpected mixing benefits in a comparatively small space.

In additional preferred embodiments, the mixing chamber may include a passive agitation structure such as internal baffles or ridges on the inner circumference of a mixing chamber in the mixer or flow disks across the interior of the mixing chamber with apertures passing therethrough. In other additional preferred embodiments, the mixing chamber may include an active agitation structure such as: a propeller, moveable mechanical fins, a vibration system, a heating system or a pressure enhancing such as a moveable diaphragm. The present invention when combined with a passive and/or active agitator produces an unexpected advance in the art of diesel fuel engines.

As described herein, the present system preferably uses a mixer to mix hydrogen gas with the liquid fuel. The present choice of a mixer is a non-obvious choice to a person skilled in the art because the present mixer has a novel geometry that provides non-obvious fuel/gas mixing benefits in a much smaller package as compared to a traditional infuser. In addition, the present use of an agitation system is also not present in a traditional infuser.

In other preferred aspects, the present invention provides a novel tube infuser for infusing gas additives into a liquid fuel that is then sent into a hydro-diesel combustion engine. In preferred aspects, the present tube infuser for generating a homogeneous mixture of liquid hydro-diesel fuel, comprises:
  a body;
  a liquid-gas mixing chamber extending along within the body;
  a gas additive inlet into the liquid-gas mixing chamber;
  a liquid fuel inlet into the liquid-gas mixing chamber; and
  a liquid-gas fuel outlet out of the liquid-gas mixing chamber;
  an agitator within the liquid-gas mixing chamber;
wherein the liquid-gas mixing chamber has a cross-sectional width and a length, and wherein the infuser has a volume between 0.1 and 10 gallons.

In various preferred aspects of the invention, the body and the liquid-gas mixing chamber therein are curved into a circular or spiral path or other generally continuous curved paths. The curved path may have a constant or variable radius of curvature. When the radius of curvature is variable, the curvature may increase through a first portion of the body and then decrease through a second portion of the body.

In various preferred aspects of the present invention, the body has a cylindrical shape that may be a plurality of rings of equal size stacked one on top of the other, or a plurality of rings of differing sizes wrapped one around another, or combinations of both. Such rings may also be co-planar to one another or stacked one on top of another. In addition, the body may be spirals that are formed into first and second spiral portions. Preferably, these first and second spiral portions may have lengths that are approximately equal. Optionally, the first spiral portion may rotate in a clockwise direction and the second spiral portion may rotate in a counterclockwise direction, or vice versa.

In optional preferred aspects, the liquid-gas mixing chamber may have a variable cross-sectional area along the length of the elongated body. For example, the variable cross-sectional area of the liquid-gas mixing chamber may repetitively widen and narrow along the length of the elongated body, and may optionally have one or more internal venture shaped portions. In optional preferred aspects, the liquid-gas mixing chamber may even be coiled around on itself to pass back within itself over a portion of the elongated body.

In optional preferred aspects, the liquid-gas mixing chamber has a cross section that can be any one or combination of the following shapes: circular, elliptical, rectangular, triangular, multi-straight walled, irregular, regular, variable or venturi shaped.

In optional preferred aspects, internal baffles may be placed within the liquid-gas mixing chamber to further homogenize gas bubbles and further facilitate mixing. These optional baffles may face upstream or downstream or both. An optional rotary mixing device that spins within the liquid-gas mixing chamber can also be used. This rotary mixing device can optionally be cycled on and off or from higher to lower rotation frequencies. This rotary mixing device can spin the mixture as it progresses through the device.

In optional preferred aspects, the internal surface of the liquid-gas mixing chamber may be roughened or coarse to agitate gas bubbles and further facilitate mixing of the gas into the liquid.

In optional preferred aspects, a heating system can be used for applying heat to the liquid-gas mixing chamber to further facilitate mixing. Such a heating system may optionally use heat from the engine of the vehicle, or from other optional heating source. Optionally, the heating may be cycled on and off or between higher and lower temperatures.

In optional preferred aspects, a vibration system can be used for applying vibration to the liquid-gas mixing chamber. Such a vibration system may optionally simply use vibration from the engine of the vehicle. Alternately, however, the vibration system may be an ultrasound vibration system or other optional vibration system.

In various aspects, the gasses passing through the liquid-gas mixing chamber may be any of hydrogen, oxy-hydrogen, propane, butane, air, oxygen, or other combustible or non-combustible gas. In addition, when a plurality of different gasses are used, they can all be introduced into the liquid-gas mixing chamber at one or different locations through a series of different gas additive inlets. Alternatively, a plurality or series of different gas additive inlets into the liquid-gas mixing chamber can be used to introduce the same type of gas at different locations along the length of the liquid-gas mixing chamber.

In optional preferred aspects, the present system also includes a bubble size sensing system for examining the sizes of gaseous bubbles within the liquid-gas mixing chamber. Such a sensing system may be a LED reflective and/or transmissive intensity determination system that passes through or reflects light on the bubbles to examine their size and homogenization in accordance with systems known in the art.

In optional preferred embodiments, the present infuser is a body that is made from a flexible material or from a metallic material that does not interact with the fuel additive.

DETAILED DESCRIPTION OF THE DRAWINGS

Figure 1:
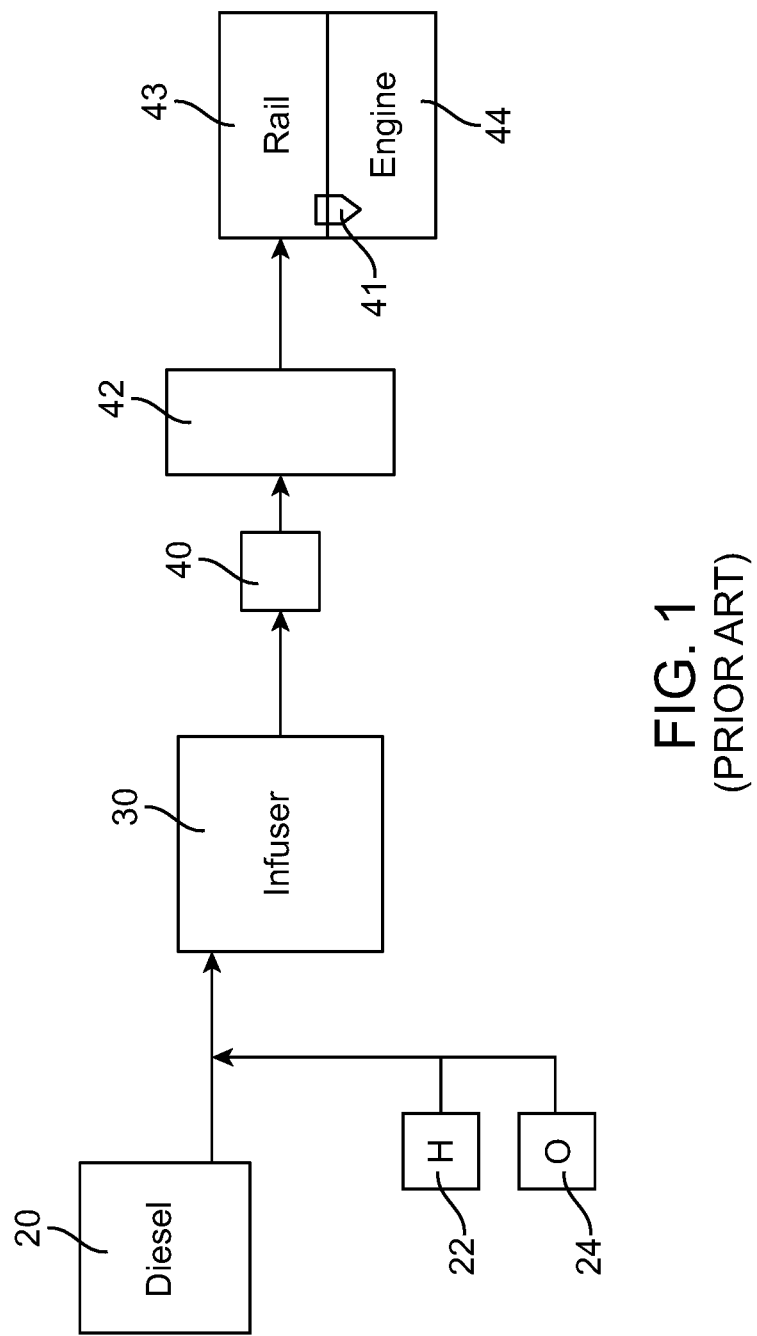
FIG. 1 is an illustration of a convention prior art hydro-diesel engine that uses a standard infuser.

FIG. 1 is an illustration of a convention prior art hydro-diesel engine that uses a standard infuser. This system includes a liquid diesel fuel source 20, a hydrogen gas source 22, and an optional oxygen source 24. An infuser 30 mixes the hydrogen and oxygen gasses with the liquid diesel fuel such that the homogenized mixture can pass sequentially through a lift pump 40, injector pump 42 and into a common rail 43 and then into combustion chamber 44 via injector 41.

Figure 2A:
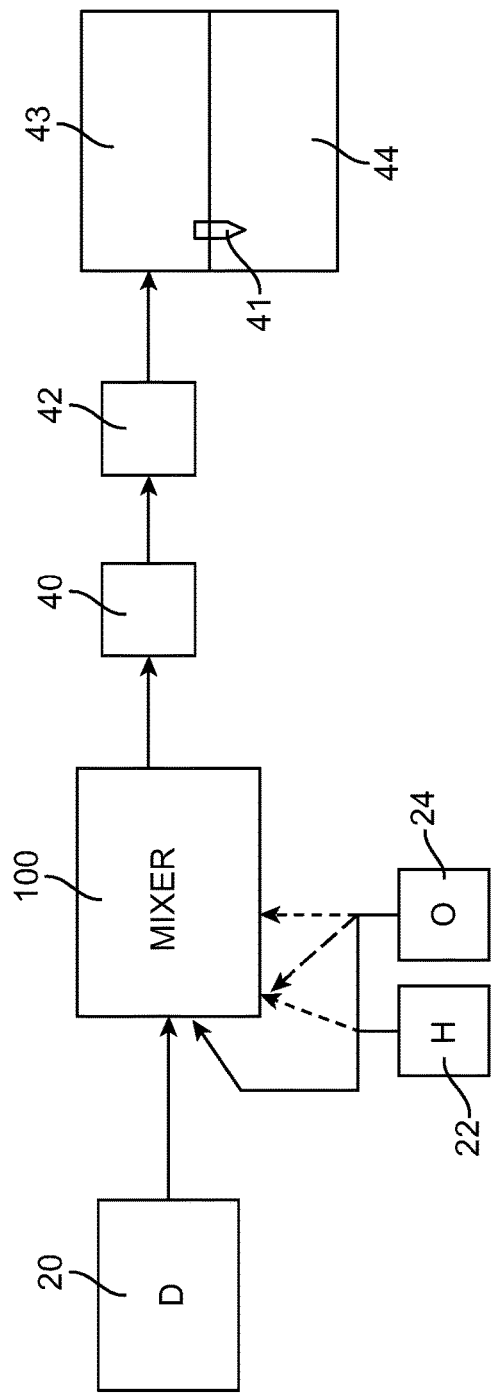
FIG. 2A is an illustration of a first embodiment of the present system showing a preferred fuel/gas mixer for use in a hydro-diesel engine having a fuel source 20, lift pump 40, injector pump 42 and combustion chamber 44.

FIG. 2A is an illustration of a first embodiment of the present system showing a preferred fuel/gas mixer 100 for use in a hydro-diesel engine. In this embodiment, a mixer 100 is used instead of the infuser 30 of FIG. 1. Mixer 100 receives hydrogen gas from source 22 and oxygen from source 24. The hydrogen and oxygen gasses can separately enter mixer 100, or be mixed together prior to entering mixer 100 (as shown by various arrangements illustrated with dotted lines). Moreover, the hydrogen and oxygen can enter mixer 100 at an end or side of the mixer.

Figure 2B:
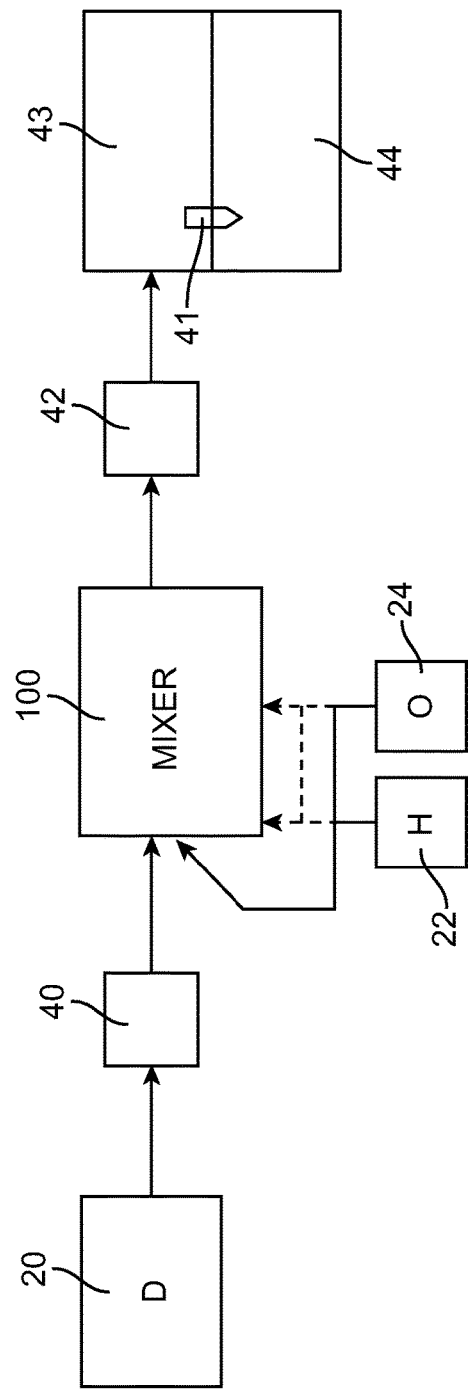
FIG. 2B is an illustration of a second embodiment of the present system showing a preferred fuel/gas mixer for use in a hydro-diesel engine in which the lift pump 40 and injector pump 42 are positioned on opposite sides of mixer 100.

FIG. 2B is an illustration of a second embodiment of the present system again showing a preferred fuel/gas mixer 100 for use in a hydro-diesel engine. In FIG. 2B, the placement of lift pump 40 is moved on the opposite side of mixer 100 closer to fuel source 20 of mixer 100.

Figure 3:
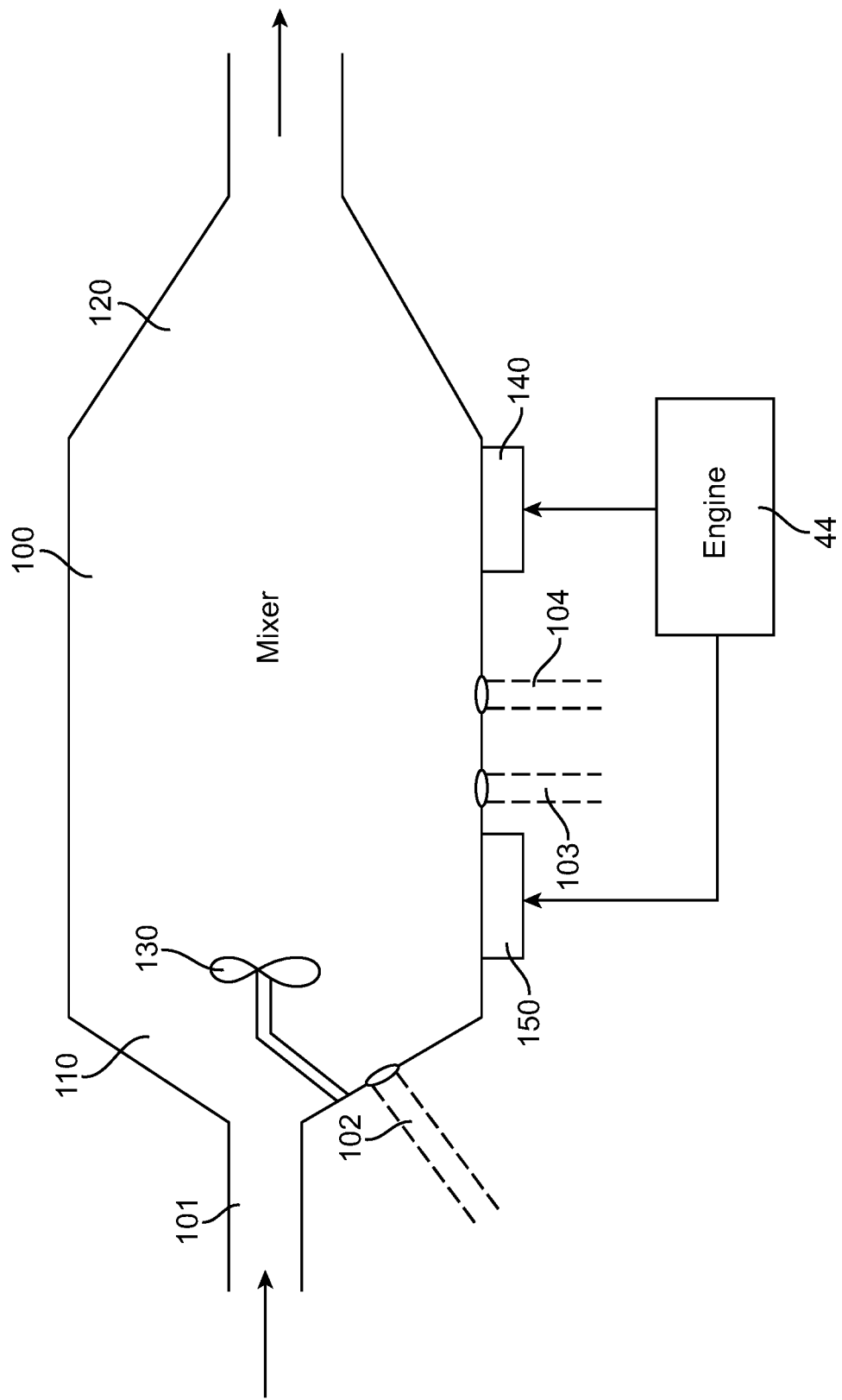
FIG. 3 is an illustration of a preferred system for providing active agitation in the mixer.

FIG. 3 is an illustration of a preferred system for providing active agitation in the mixer. In this system, mixer 100 is a cylindrical container having an entrance funnel 110 an exit funnel 120. In preferred aspects, mixer 100 has an internal mixing chamber with a diameter between 2" and 8" and a length between 6" and 24". Preferably as well, the entrance funnel 110 and exit funnel 120 each have a length between 3" and 10".

As can also be seen, mixer 100 preferably has an inlet 101 through which diesel fuel or a mixture of hydrogen (or other gas) and diesel fuel can enter the mixer. Also shown in dotted lines, a gas inlet 102 can be provided. In this situation, diesel fuel enters mixer 100 through inlet 101 and hydrogen gas enters mixer 100 through inlet 102. Additionally, another inlet 103 may be included. In this situation, an additional gas (including but not limited to oxygen) can enter mixer 100. As can be appreciated, diesel fuel, hydrogen, and other gasses can use any of inlets 101, 102, 103 and 104 to enter mixer 100, all keeping within the scope of the present invention. In addition, the same gas may enter through different inlets. For example, diesel fuel can enter through inlet 101 and hydrogen can simultaneously enter through inlets 102 and 103 and 104, all keeping within the scope of the present invention. Preferably, hydrogen gas enters the mixer at a pressure between 2 and 20 psi, and exits the mixing chamber at a fluid pressure between 2 and 18 psi.

In optional embodiments shown in FIG. 3, systems are provided to actively agitate the mixture of hydrogen gas in the liquid diesel fuel to improve mixing. For example, the active agitation system can include a propeller 130 (or moveable mechanical fins that rotate or move side to side or laterally back and forth) in the mixing chamber, a vibration system 140 for vibrating the mixer, or a heating system 150 for warming the mixing chamber. Heat and vibration from the engine 44 itself can also be used to both heat or vibrate the mixing chamber. Optionally, a pressure enhancing system such as moveable diaphragms within the mixing chamber may also be used to enhance mixing of the hydrogen gas into the liquid diesel fuel.

Figure 4:
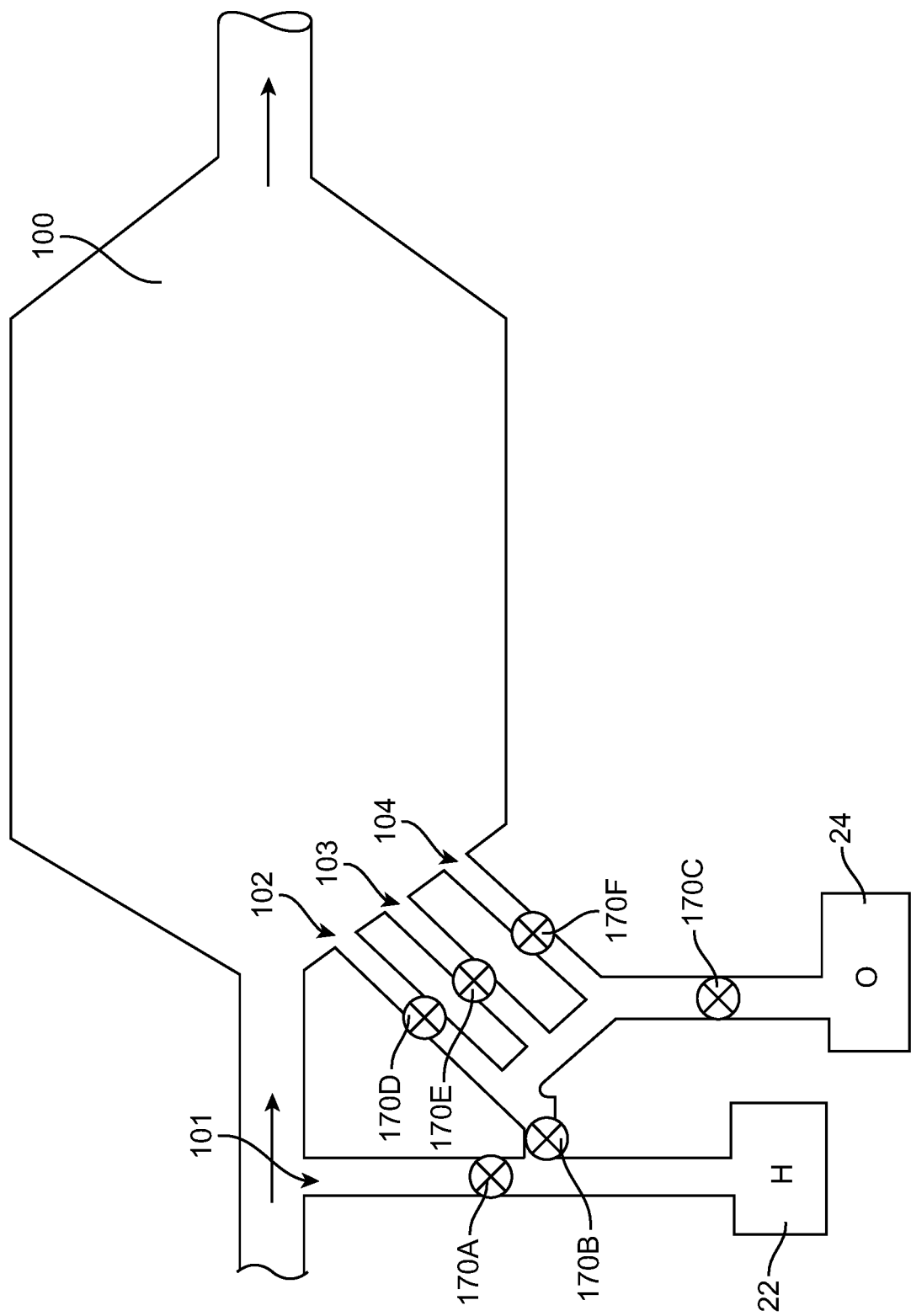
FIG. 4 is an illustration of a preferred hydrogen-oxygen mixing system.

FIG. 4 is an illustration of another preferred hydrogen-oxygen mixing system. In this system, various valves and piping are included such that the hydrogen and oxygen gases may be introduced separately or together into mixer 100 at various locations at either the terminal end (at or near the entrance funnel 110). As such, the hydrogen may be injected into the mixer 100 alone, the oxygen may be injected into the mixer 100 alone, the hydrogen and oxygen may be combined and injected together into mixer 100, or the hydrogen and oxygen may be simultaneously injected into the mixer 100 at different locations.

For example, the present system may include valves 170A, 170B, 10C, 170D, 170E and 170F. (It is to be understood that other valving arrangements are also contemplated, all keeping within the scope of the present invention). When valves 170A, 170B and 170C are open (and 170D, 170E and 170F are closed), then hydrogen and oxygen will be sent together into inlet 101. When only 170A is open (and all other valves are closed), then only hydrogen gas will be sent into inlet 101. If valve 170A is closed and 170B, 170C and 170E opened (with all other valves closed), then hydrogen and oxygen will be sent together into inlet 103. If valves 170B is closed (and all other valves are opened), then hydrogen gas will be sent into inlet 101 and oxygen will be simultaneously sent into inlets 102, 103 and 104. As can be appreciated, these arrangements are only exemplary and the present invention encompasses different systems for sending hydrogen, oxygen and other gasses into mixer 100 at different locations, with the gasses mixing either in the mixing chamber itself, or with pre-mixing of the gasses prior to entering the mixing chamber through one or more of inlets 101, 102, 103, etc. Also, additional gas inlets (not illustrated) may be added.

Figure 5:
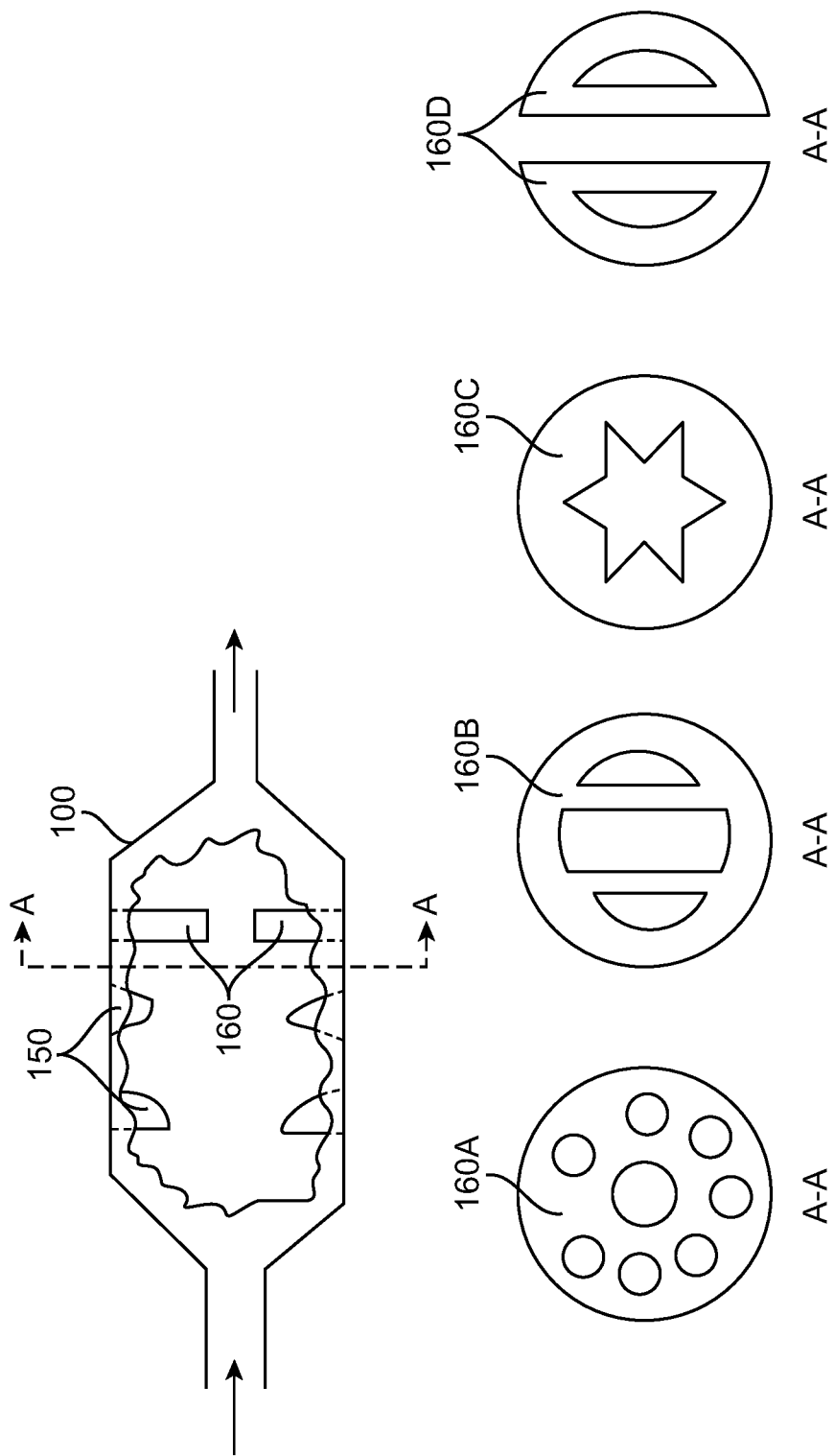
FIG. 5 is an illustration of a preferred system for providing passive agitation in the mixer.

FIG. 5 illustrates various systems for agitating the mixture of hydrogen gas in liquid diesel fuel with a passive agitation structure in the mixer. As illustrated, these passive agitation structures can include internal baffles or ridges 150 on the inner circumference of a mixing chamber in the mixer. Alternately, or in addition, the passive agitation structure in the mixer can include flow disks 160A, 160B, 160C or 160D passing across the interior of the mixing chamber, with the flow disks having one or more apertures passing therethrough. It is to be understood that other flow disks having different geometries can also be used, all keeping within the scope of the present invention.

In a preferred method of operation, the present system provides a method of enhancing diesel fuel combustion through the use of mixer 100 for mixing hydrogen into a liquid diesel fuel prior to combusting the fuel mixture in a combustion chamber, by: (a) providing a supply of liquid diesel fuel 20; (b) passing the liquid diesel into a mixer 100 having a mixing chamber; (c) bubbling hydrogen gas into the liquid diesel fuel in the mixing chamber; (d) agitating the hydrogen gas within the liquid diesel fuel to form a homogenous fuel mixture; (e) pressurizing the homogenous fuel mixture thereby reducing the size of hydrogen bubbles in the homogeneous fuel mixture; (f) receiving oxygen into a combustion chamber through an air intake; (g) compressing the air by raising a piston in the combustion chamber causing the air to heat; (h) injecting the pressurized homogenous fuel mixture into a combustion chamber; (i) exposing the homogenous fuel mixture to a lower pressure in the combustion chamber thereby permitting the size of the hydrogen bubbles to expand and break up diesel fuel particles and distribute diesel fuel throughout the combustion chamber; and (j) permitting the homogenous fuel mixture to spontaneously combust in the combustion chamber. Oxygen (or other gasses) may also be bubbled into the liquid diesel fuel in the mixing chamber. The hydrogen gas is pressurized in mixer 100 when forming the homogeneous fuel mixture of hydrogen gas in liquid diesel fuel. A pump may be positioned upstream or downstream of mixer 100. The air received into the combustion chamber may be from ambient air received into the combustion chamber.

Figure 6:
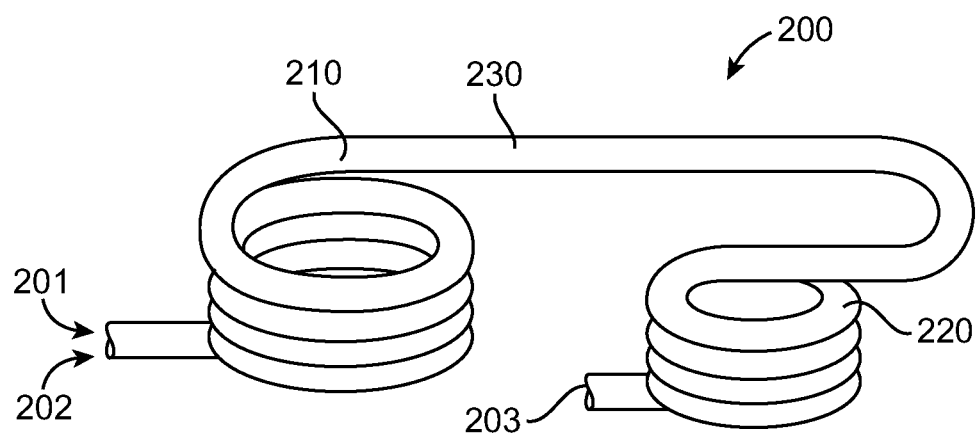
FIG. 6 is an illustration of a preferred tube infuser having a plurality of separate cylindrical sections.
Figure 7:
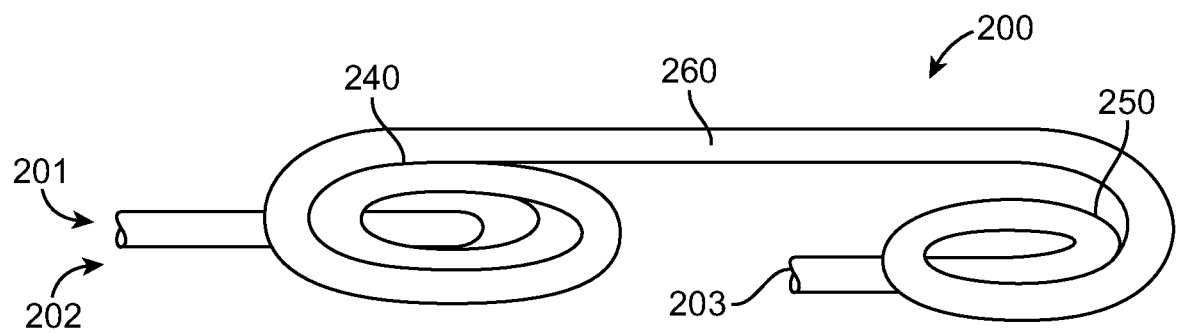
FIG. 7 is an illustration of a second preferred tube infuser having two separate spiral sections.
Figure 8:
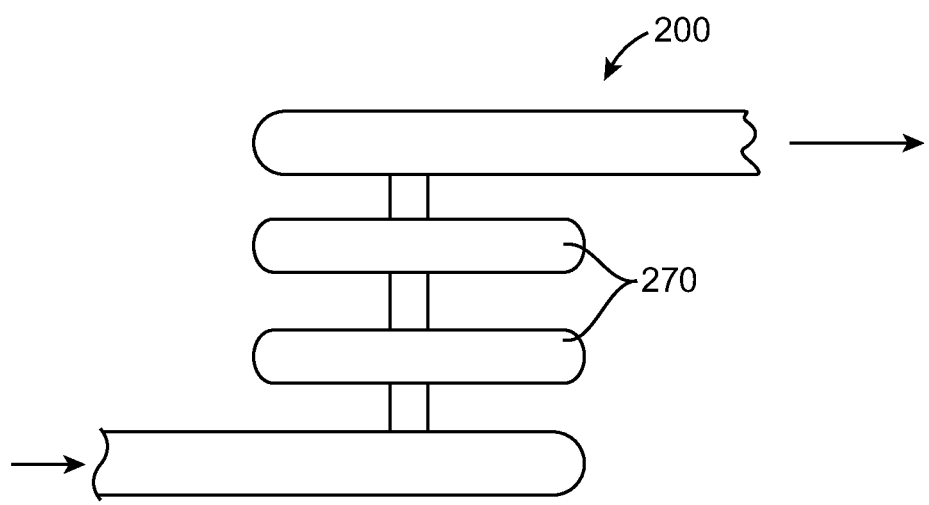
FIG. 8 is an illustration of a third preferred tube infuser having a single stack of a plurality of spiral sections.

As described above, FIGS. 6, 7 and 8 show three exemplary embodiments of the present tube infuser 200 (which may be used instead of the Mixer 100 of FIGS. 3 to 5). FIGS. 6 and 7 show spiral or cylindrical sections 210 and 220 of a generic continuous curved tube infuser 200 either nested or stacked to one another. FIGS. 6 and 7 show two separate sections 210 and 220 that may be connected together with further tubing 230. Lastly, FIG. 8 shows the entire tube infuser 200 as a single stacked series of spiral rings of approximately the same size. It is to be understood that the present long tube infuser 200 can be made from any of these embodiments or any combination of these three embodiments. The present long tube infuser 200 can also be made from other embodiments that are not illustrated, such as straight tube sections. The continuous curve section of the infuser tube 200 is preferably more than 50% of the tube length.

In preferred aspects, the present system comprises a tube infuser 200 for generating a homogeneous mixture of liquid hydro-diesel fuel. In preferred aspects, tube infuser has an elongated body with an interior liquid-gas mixing chamber extending along within the elongated body. At one end are a gas additive inlet 201 into the interior liquid-gas mixing chamber and a liquid fuel inlet 202 into the liquid-gas mixing chamber, with a liquid-gas fuel outlet 203 at an opposite end. Systems for agitation within the liquid-gas mixing chamber of the elongated body are also provided. The present inventors have determined that the use of a long curved, spiraled or coiled mixing tube substantially enhances the mixing of the gas fuel into the liquid fuel. In preferred aspects, the present tube infuser may be a long flexible tube, including a flexible hose or rigid tube. In optional preferred aspects, the liquid-gas mixing chamber has a volume of up to 10 Gal with a preferred range up to 2 Gal. The volume is determined as the time required for full mixing, dwell time, that depends on engine consumption which is in the range of up to 15 minutes with a preferred range of up to 5 minutes. In optional aspects, the volume of the liquid-gas mixing chamber is between 0.1 Gal and 10 Gal, and a dwell time from gas additive/fuel mixing in the range of 0.5 to 15 minutes.

The present tube infuser 200 preferably comprises an elongated body (i.e.: the outside portions of the long tube) and a liquid-gas mixing chamber (i.e.: the long hollowed out inner portion of the elongated body). Preferably, both are curved into a curved, circular, coiled, spiral, straight or serpentine path, as illustrated.

At the upstream end of the present tube infuser, the gas(s) and the liquid(s) enter the liquid-gas mixing chamber (at 201 and 202). At the downstream end 203, the homogeneously mixed gas-liquid mixture exits the mixing chamber. As the gas and liquid pass along down through the length of the liquid-gas mixing chamber, the curved, spiral or coiled inner walls of the mixing chamber disrupt the gas bubbles and promote homogenous mixing. Various different curved paths may be used, as illustrated. In optional preferred aspects, these straight, curved, bent, coiled or spiraled sections may have constant or variable lengths or curvatures. In addition, the variable radius of curvature may increase through a first portion of the elongated body and then decrease through a second portion of the elongated body, or vice versa, for example, to achieve a venture effect. In addition, the inner surface of the liquid-gas mixing chamber may be rough or coarse to agitate gas bubbles and further promote homogeneous mixing without activation, or determined by conventional internal combustion engineering.

The presently illustrated spiral shape of the plurality of rings results in rings that may be stacked one on top of the other as seen in FIG. 6. Conversely, when the spiral rings are of different diameters, the rings of differing sizes can be wrapped one around another as seen in FIG. 7. First, FIG. 6 illustrates tube infuser 200 having a first cylindrical section 210 near an upstream end of the infuser (i.e.: where the gas and liquid fuels separately enter the mixing chamber of the infuser), and a second cylindrical section 220 near a downstream end of the infuser (i.e.: where the homogeneously mixed gas-liquid mixture leaves the mixing chamber of the infuser. In preferred embodiments, these two separate cylindrical sections 210 and 220 may have the same or different radius of curvature, and may be adjacent or nested within one another. In addition, these two cylindrical sections are preferably connected with tubing 230 running therebetween. Next, FIG. 7 is an illustration of a second preferred tube infuser having two separate spiral or coiled sections 240 and 250. As illustrated, coiled sections 240 and 250 may have differing radii of curvature such that successive coils may be wrapped one around another and thereby disposed in the same plane. Coiled sections 240 and 250 are preferably connected with tubing 260 running therebetween.

FIGS. 6 and 7 illustrate embodiments of the invention wherein the first spiral portion rotates in a clockwise direction and the second spiral portion rotates in a counterclockwise direction. The Applicants believe that changing the rotational direction of the gas-liquid mixture passing through the tube infuser further enhances the mixing of the gas bubbles into the liquid fuel. It is to be understood that such directional rotation can be changed more than once through the length of the tube infuser. For example, the mixture may be rotated in both clockwise and counterclockwise directions more than once through the length of tube infuser 200.

FIG. 8 is an illustration of a third preferred tube infuser having a single stack of a plurality of spiral sections 270. In preferred aspects, the outer diameters of these stacked sections 270 are equal to one another. The separate spiral sections preferably connect to each other inside to inside and outside to outside and vice versa.

Figure 9:
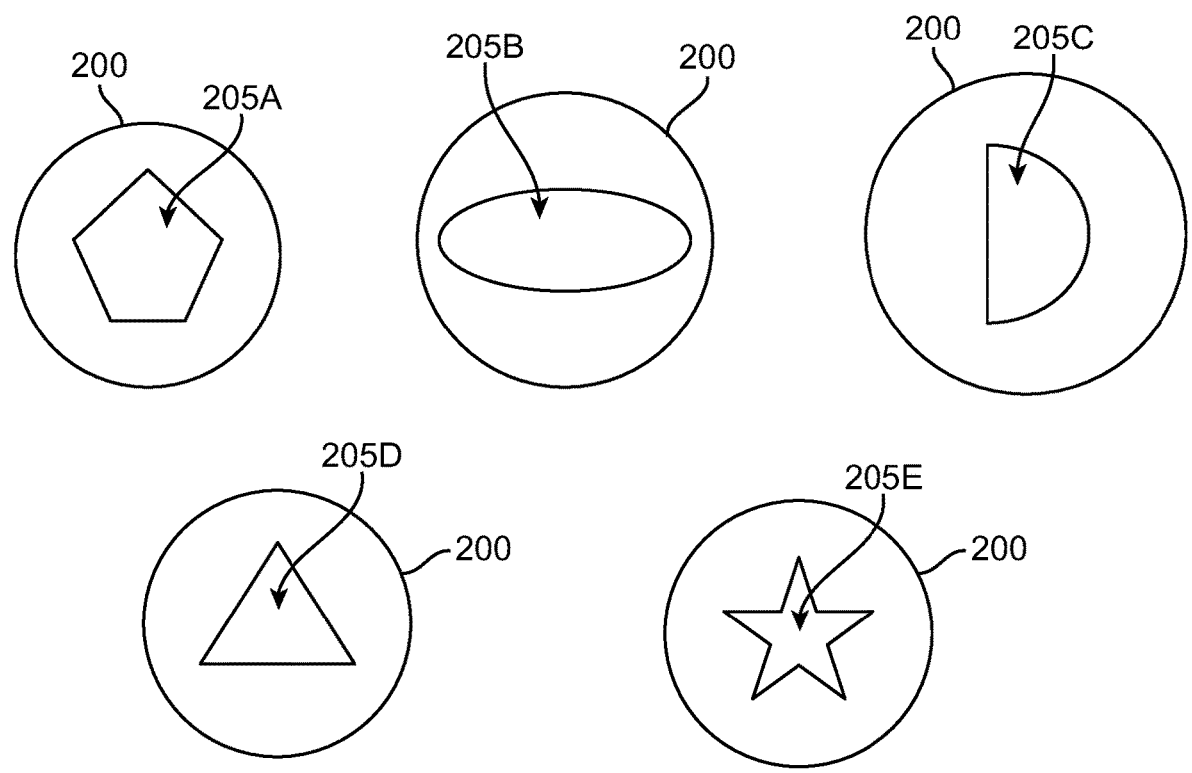
FIG. 9 illustrates a plurality of different infuser cross sectional shapes (for the long infusers of FIGS. 6 to 8). It is to be understood that the present system is not limited to these illustrated cross sectional shapes, and the cross section may vary in shape along its length.

FIG. 9 illustrates a plurality of different infuser cross sectional shapes (for the long infusers 200 of FIGS. 6 to 8). Specifically, the cross section 205 of the infuser 200 may be any of pentagon 205A, elliptical 205B, D-shaped 205C, triangular 205D or star shaped 205D. It is to be understood, however, that the present system is not limited to these illustrated cross sectional shapes, and may include multi-straight walled, irregular, regular, variable or venturi shaped sections, and the cross section 205 of infuser 2000 may also vary in shape along its length. Specifically, the liquid-gas mixing chamber of tube infuser 200 may have a variable cross-sectional area along the length of the elongated body, and the variable cross-sectional area of the liquid-gas mixing chamber repetitively widens and narrows along the length of the elongated body.

Figure 10:
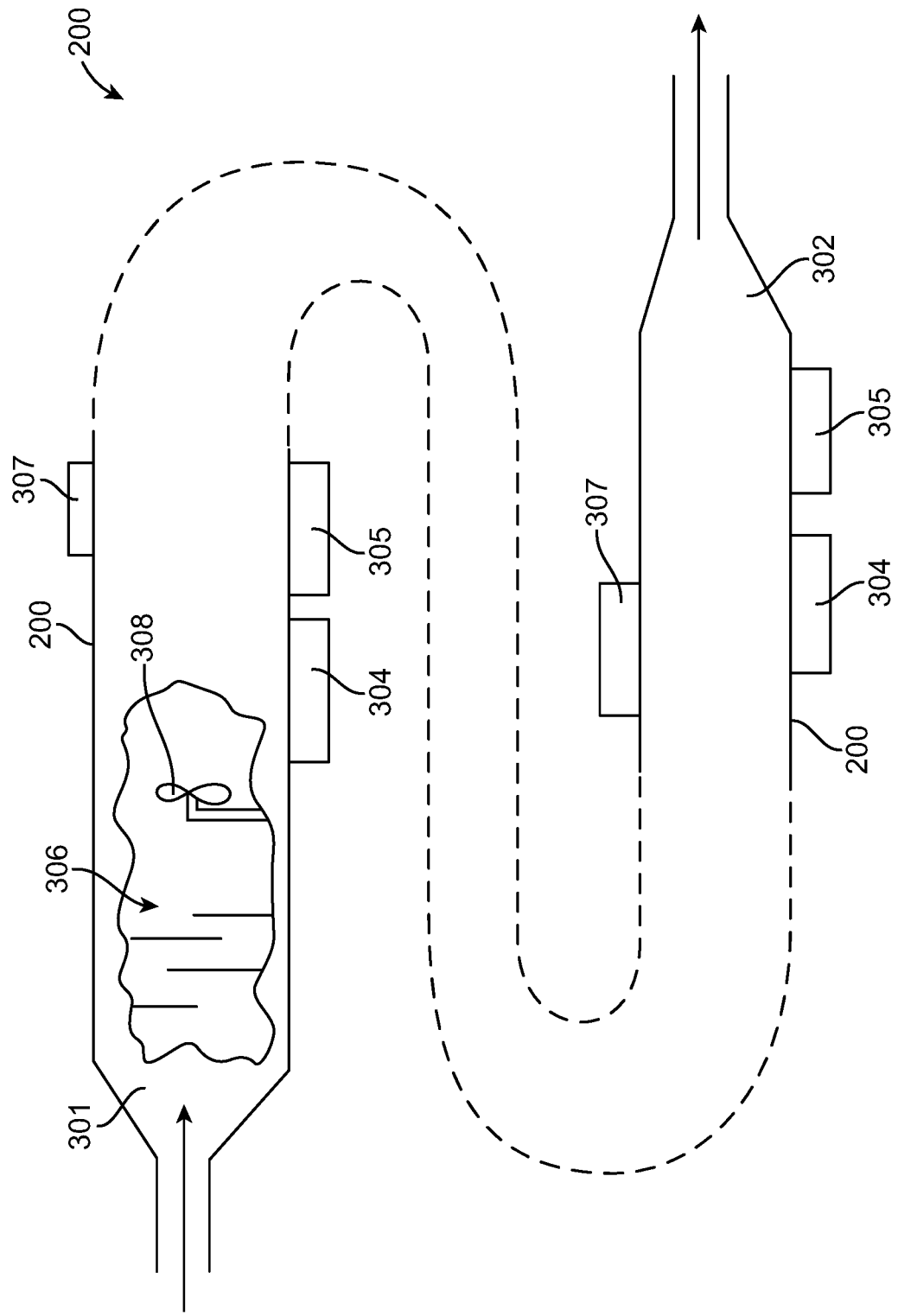
FIG. 10 illustrates the ends of the present tube infuser showing an optional inlet and outlet funnel, an optional heater, an optional vibration system, a series of optional internal baffles and an optional mixing propeller.

FIG. 10 illustrates the ends of the present tube infuser 200 showing an optional inlet funnel 301 (connected to the gas additive inlet and to the liquid fuel inlet) and outlet funnel 302 (connected to the liquid-gas outlet), an optional heater 304 applying heat to the liquid-gas mixing chamber), optional pressure system 307, an optional vibration system 305, and a series of optional internal baffles 305 and an optional mixing propeller 308. Optional internal baffles may be either or both of rearwardly or forwardly facing. The heater, pressure and vibration systems may be static or cycling.

Heating system 304 may extract heat from an engine of a vehicle in which the infuser 200 is installed. In preferred embodiments, vibration system 305 can be included for applying vibration to the liquid-gas mixing chamber. The vibration system can operate by vibration from an engine of a vehicle in which the infuser is installed, or be an ultrasound vibration system, or some other vibration system.

In optional embodiments, a pressure enhancing system such as moveable diaphragms in the mixing chamber may also be used. Such internal baffles or ridges on the inner circumference of the mixing chamber may optionally include flow disks across the interior of the mixing chamber with apertures passing therethrough. Moveable internal mechanical fins or a pressure enhancing such as a moveable diaphragm may also be used.

It is to be understood that the present tube infuser system can be used with a wide variety of different gasses (with these various gasses being used in various combinations, and introduced into the infuser at different times and locations, as desired). In various aspects, these gasses may include hydrogen, oxy-hydrogen, propane, butane, air, oxygen, or other combustible or non-combustible gas. Moreover, a plurality of sequential gas additive inlets into the infuser can be used. Each of these sequential gas additive inlets can optionally be connected to supplies of different fuel gases, or to the same fuel gasses, or mixtures thereof. These sequential gas additive inlets can be positioned at different lengths along of the liquid-gas mixing chamber, as desired.

In further optional embodiments, a sensing system 306 may be included for determining the size of the microbubbles of gas in the liquid-gas mixing chamber in the long lube infuser. Optionally, the bubble size sensing system 306 may be an LED reflective intensity detection system.

In preferred embodiments, the tube infuser 200 is a long, flexible plastic or rubberized tube (such as a hose). In these embodiments, the mixing chamber preferably extends substantially along the length of the whole elongated body. As such, due to the long length of the present infuser, the gases have an excellent opportunity to mix homogeneously into the liquid fuel stream.

In preferred aspects, the present system provides a system for enhancing diesel fuel combustion; comprising: a liquid diesel fuel source 20; a hydrogen gas source 22; an optional oxygen source 24; and a tube infuser 200 configured with inputs to receive each of the liquid diesel fuel, hydrogen gas and oxygen gas therein, wherein the tube infuser comprises: an elongated body; a liquid-gas mixing chamber extending along within the elongated body; a gas additive 202 inlet into the liquid-gas mixing chamber; a liquid fuel inlet 201 into the liquid-gas mixing chamber; and a liquid-gas fuel outlet 203 out of the liquid-gas mixing chamber; and an agitator structure mounted in the liquid-gas combustion chamber. In preferred aspects, the liquid-gas mixing chamber has a cross-sectional width and a length, wherein the volume of the liquid-gas mixing chamber is up to 10 Gal, and a dwell time from gas additive/fuel mixing in the range of up to 5 minutes. Optionally, a plurality of sequential gas additive inlets may be positioned at different lengths along of the liquid-gas mixing chamber, and wherein each of the sequential gas additive inlets are connected to supplies of different fuel gases. In preferred aspects, the elongated body of tube infuser 200 is made from a flexible plastic.

It is to be understood that the presently claimed invention is not limited to the specific embodiments disclosed herein, but also covers equivalent embodiments as understood by a person skilled in the relevant art. Any reference to singular herein is understood to cover plural, and any reference to plural herein is understood to cover singular.

What is claimed is:

1. A method of enhancing diesel fuel combustion through the use of a mixer for mixing hydrogen into a liquid diesel fuel prior to combusting the fuel mixture in a combustion chamber, comprising:
   (a) providing a supply of liquid diesel fuel;
   (b) passing the liquid diesel into a mixer having a mixing chamber;
   (c) bubbling hydrogen gas into the liquid diesel fuel in the mixing chamber;
   (d) agitating the hydrogen gas within the liquid diesel fuel to form a homogenous fuel mixture;
   (e) moving the homogenous fuel mixture out of the mixing chamber;
   (f) pressurizing the homogenous fuel mixture thereby reducing the size of hydrogen bubbles in the homogeneous fuel mixture;
   (g) receiving oxygen into a combustion chamber through an air intake;
   (h) compressing the air within the mixing chamber by raising a piston in the combustion chamber causing the air to heat;
   (i) injecting the pressurized homogenous fuel mixture into a combustion chamber;
   (j) exposing the homogenous fuel mixture to a lower pressure in the combustion chamber thereby permitting the size of the hydrogen bubbles to expand and disperse the diesel fuel mixture throughout the combustion chamber; and
   (j) permitting the homogenous fuel mixture to spontaneously combust in the combustion chamber, wherein the hydrogen gas and oxygen gas are introduced into the mixing chamber through a hydrogen-oxygen mixing system that permits:
      hydrogen gas alone to enter a liquid-gas mixing chamber,
      oxygen gas alone to enter the liquid-gas mixing chamber,
      hydrogen gas and oxygen gas to be mixed together and then enter the liquid-gas mixing chamber together, or
      hydrogen gas and oxygen gas to separately enter the liquid-gas mixing chamber.

2. The method of claim 1, further comprising:
   (k) bubbling oxygen into the liquid diesel fuel in the mixing chamber.

3. The method of claim 1, wherein the hydrogen gas is bubbleized under pressure into the mixing chamber when forming the homogeneous fuel mixture of hydrogen gas in liquid diesel fuel.

4. The method of claim 1, wherein the hydrogen gas enters the mixer at a pressure between 2 and 20 psi, and exits the mixing chamber at a fluid pressure between 2 and 18 psi.

5. The method of claim 1, wherein the mixer is a cylindrical container having an entrance funnel and an exit funnel.

6. The method of claim 5, wherein the mixer has a diameter between 2" and 8" and a length between 6" and 24", and wherein the entrance and exit have a length between 3" and 10".

7. The method of claim 1, wherein the hydrogen gas is agitated within the liquid diesel fuel by a passive agitation structure comprising:
   internal baffles or ridges on an inner circumference of the mixing chamber, or
   flow disks passing across the interior of the mixing chamber, the flow disks having one or more apertures passing therethrough.

8. The method of claim 1, wherein the hydrogen gas is agitated within the liquid diesel fuel by one or more active agitation structures selected from the group of:
   a propeller in a mixing chamber in the mixer,
   moveable mechanical fins in the mixing chamber,
   a vibration system for vibrating the mixing chamber,
   a heating system for warming the mixing chamber, or
   a pressure enhancing system for pressurizing the mixing chamber.

9. The method of claim 1, further comprising:
   passing the diesel fuel through a pump prior to passing the diesel fuel into the mixer, or
   passing the mixture of hydrogen gas in liquid diesel fuel exiting the mixer through a pump prior to passing the mixture of hydrogen gas in liquid diesel fuel into the combustion chamber via an injection pump.

10. A system for enhancing diesel fuel combustion; comprising:
    a liquid diesel fuel source;
    a hydrogen gas source;
    an oxygen source;
    a mixer configured with inputs to receive each of the liquid diesel fuel, hydrogen gas and oxygen gas therein, wherein the mixer is a cylindrical container having an entrance and an exit;
    a hydrogen-oxygen mixing system permitting:
       hydrogen gas alone to enter a liquid-gas mixing chamber,
       oxygen gas alone to enter the liquid-gas mixing chamber,
       hydrogen gas and oxygen gas to be mixed together and then enter the liquid-gas mixing chamber together, or
       hydrogen gas and oxygen gas to separately enter the liquid-gas mixing chamber; and
    one or more agitators.

11. The system of claim 10, wherein the mixer has a diameter between 2" and 8" and a length between 6" and 24", and wherein the entrance funnel and exit funnel have a length between 3" and 10".

12. The system of claim 10, wherein the agitator comprises:

a passive agitation structure in a mixing chamber in the mixer, and wherein the passive agitation structure comprises one of:
internal baffles on an inner circumference of a mixing chamber in the mixer,
internal ridges on an inner circumference of a mixing chamber in the mixer, or
flow disks passing across the interior of the mixing chamber, the flow disks having one or more apertures passing therethrough.

13. The system of claim 10, wherein the agitator comprises:
an active agitation structure in a mixing chamber in the mixer, and wherein the active agitation structure is one or more of the group:
a propeller in a mixing chamber in the mixer,
moveable mechanical fins in the mixing chamber,
a vibration system for vibrating the mixer,
a heating system for warming the mixing chamber, or
a pressure enhancing system for pressurizing the mixing chamber.

14. A system for enhancing diesel fuel combustion; comprising:
a liquid diesel fuel source;
a hydrogen gas source;
an oxygen source; and
a tube infuser configured with inputs to receive each of the liquid diesel fuel, hydrogen gas and oxygen gas therein, wherein the tube infuser comprises:
an elongated body;
a liquid-gas mixing chamber extending along within the elongated body;
a hydrogen-oxygen mixing system permitting:
hydrogen gas alone to enter the liquid-gas mixing chamber,
oxygen gas alone to enter the liquid-gas mixing chamber,
hydrogen gas and oxygen gas to be mixed together and then enter the liquid-gas mixing chamber together, or
hydrogen gas and oxygen gas to separately enter the liquid-gas mixing chamber;
a liquid fuel inlet into the liquid-gas mixing chamber; and
a liquid-gas fuel outlet out of the liquid-gas mixing chamber;
an agitator structure mounted in the liquid-gas combustion chamber;
wherein the liquid-gas mixing chamber has a cross-sectional width and a length, and wherein the volume of the liquid-gas mixing chamber is between 0.1 Gal and 10 Gal, and a dwell time from gas additive/fuel mixing in the range of 0.5 to 15 minutes.

15. A tube infuser for generating a homogeneous mixture of liquid hydro-diesel fuel, comprising:
an elongated body;
a liquid-gas mixing chamber extending along within the elongated body;
a hydrogen-oxygen mixing system permitting:
hydrogen gas alone to enter the liquid-gas mixing chamber,
oxygen gas alone to enter the liquid-gas mixing chamber,
hydrogen gas and oxygen gas to be mixed together and then enter the liquid-gas mixing chamber together, or
hydrogen gas and oxygen gas to separately enter the liquid-gas mixing chamber;
a liquid fuel inlet into the liquid-gas mixing chamber; and
a liquid-gas fuel outlet out of the liquid-gas mixing chamber;
an agitator structure mounted in the liquid-gas mixing chamber;
wherein the liquid-gas mixing chamber has a cross-sectional width and a length, and wherein the volume of the liquid-gas mixing chamber is between 0.1 Gal and 10 Gal, and a dwell time from gas additive/fuel mixing in the range of 0.5 to 15 minutes.

16. The tube infuser of claim 15, wherein the elongated body and liquid-gas mixing chamber are curved into a path having a constant or variable radius of curvature.

17. The tube infuser of claim 15, wherein the elongated body has a spiral shape comprised of a plurality of spiral members of equal size stacked one on top of the other, or a plurality of spiral members of differing sizes wrapped one around another.

18. The tube infuser of claim 15, wherein the elongated body and the liquid-gas mixing chamber are curved into a first curved portion and a second curved portion that are connected together and represent more than 50% of the tube length.

19. The tube infuser of claim 18, wherein the first spiral portion rotates in a clockwise direction and the second spiral portion rotates in a counterclockwise direction.

20. The tube infuser of claim 15, wherein the liquid-gas mixing chamber has a cross section that is:
circular, elliptical, rectangular, triangular, multi-straight walled, irregular, regular, variable or venturi shaped along the length of the elongated body.

21. The tube infuser of claim 15, further comprising any one of:
internal baffles within the liquid-gas mixing chamber,
a rotary mixing propeller device that spins within the liquid-gas mixing chamber,
a heating system for applying heat to the liquid-gas mixing chamber, or
a vibration system for applying vibration to the liquid-gas mixing chamber.

22. The tube infuser of claim 15, wherein the liquid-gas mixing chamber comprises:
an input funnel connected to the gas additive inlet and to the liquid fuel inlet, and
an output funnel connected to the liquid-gas outlet.

23. The tube infuser of claim 15, wherein the gas additive inlet is connected to a supply of:
hydrogen, oxy-hydrogen, propane, butane, air, oxygen or carbon dioxide.

24. The tube infuser of claim 15, wherein the gas additive inlet comprises:
a plurality of sequential gas additive inlets positioned at different locations along of the liquid-gas mixing chamber, and wherein each of the sequential gas additive inlets are connected to supplies of different fuel gases.

25. The tube infuser of claim 15, further comprising:
a bubble size sensing system for determining the sizes of gaseous bubbles within the liquid-gas mixing chamber.

26. The tube infuser of claim 15, wherein the elongated body is made from a flexible tubing.

* * * * *